June 26, 1934.    L. EDELMANN    1,964,145
HYDROMETER FLOAT
Filed Feb. 12, 1929
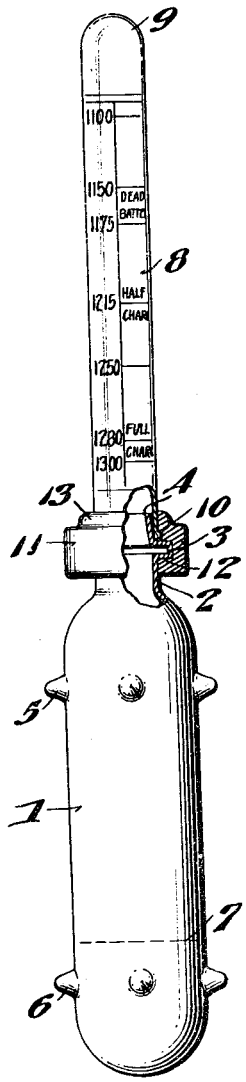
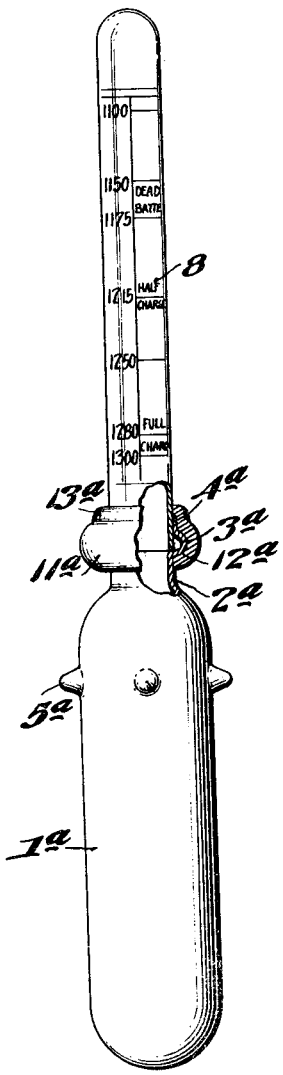
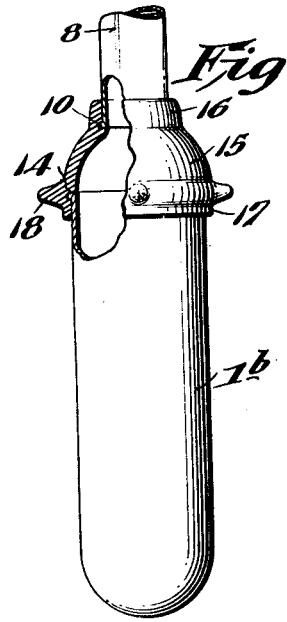
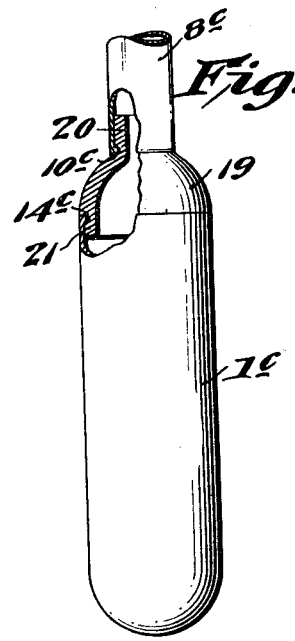
INVENTOR.
Leo Edelmann
BY
Lloyd W. Batch
ATTORNEY.

Patented June 26, 1934

1,964,145

UNITED STATES PATENT OFFICE 1,964,145

HYDROMETER FLOAT

Leo Edelmann, Chicago, Ill., assignor to E. Edelmann & Co., Chicago, Ill., a corporation of Illinois Application February 12, 1929, Serial No. 339,404

5 Claims. (Cl. 265—45)

My invention relates to improvements in hydrometer floats, and particularly to a float adapted for use in a syringe hydrometer or other hand instrument intended to be used in determining the specific gravity of liquids in batteries and the like.

An object of this invention is to provide a float which can be fitted for use with a syringe hydrometer, or like instrument, of standard form, in place of the usual glass float, and which will withstand the ordinary shocks of use without breaking.

A further object is to so construct the parts that a better scale adjustment and more accurate calibration can be made.

Still another object resides in so constructing and associating the parts that the several portions can be manufactured in quantities to each duplicate the other, as far as commercially practicable, and the instrument can be completed and assembled without resorting to the services of a glass-blower or other skilled mechanic or without the use of special apparatus.

Yet another object is to provide hydrometers which can be manufactured and assembled, commercially, with less trouble and greater accuracy than heretofore.

With the above and other objects in view which will be apparent to those skilled in the art, my invention includes certain novel features of construction and combinations of parts which will be hereinafter set forth in connection with the drawing.

In the drawing:

Figure 1 is a view in elevation of a float constructed in accordance with my invention, with parts shown in section to better illustrate the construction and assembly.

Fig. 2 is a view similar to Fig. 1 illustrating a modified construction.

Figs. 3 and 4 are fragmentary views similar to portions of Fig. 1 showing still other modified constructions.

At the present time, it is customary to make the float elements used in hydrometers and like instruments with the float bulb and the gauge stem entirely of glass, the float bulb and stem being assembled with the upper end of the stem open. Lead shot or other material is fed through the upper end of the stem to drop into the closed bottom of the float bulb and give the desired weight to cause the float element to ride within the liquid in an upright or vertical position, this shot being usually sealed in wax or otherwise secured. With the instrument thus weighted readings are taken in different liquids of non-specific gravity to establish two or more determinable scale points and these are marked on the gauge tube. A scale calibrated according to the determined markings is then fitted within the gauge tube and the upper end of the tube is closed, thus completing the hydrometer float element. With this method of construction the services of a glass-blower are required to close the ends of the gauge tubes and unless infinite care is exercised the amount of glass adhering at the closed end will vary with each float element upon completion, thus varying the weight of the instrument and consequently destroying the accuracy of the initial scale markings to which the gauge scale has been fitted.

It is the purpose of my present invention to provide a hydrometer structure with which the usual wafer-thin glass of the float bulb is dispensed with and in place thereof a non-frangible or less frangible material is substituted; and also, I aim to provide a hydrometer float which can be more accurately and expeditiously calibrated with a higher degree of precision, than is possible with hydrometer floats as now ordinarily manufactured commercially.

The float bulb portion 1 can be molded or shaped to be of celluloid, or other suitable material, which will serve the desired purpose and will not be readily frangible. This float bulb 1 is made of the usual shape and size and has a coupling neck 2 at the upper end thereof, the lower end being closed. A flange 3 is molded or otherwise formed around this coupling neck and beyond the flange the neck is slightly reduced as at 4, preferably on a gradual taper. The usual spacing points or projections 5 and 6 can be provided around the float bulb to hold the same centered within a hydrometer liquid barrel, and the usual, or any desired, weighting material will be introduced into the lower end of the float bulb 1 as at 7, to insure that the bulb will ride within the liquid in a vertical relation.

The gauge tube 8 is closed at one end as at 9 and is open at its remaining end to receive the tapered flange portion 4 of the coupling neck 2. A bead 10 is preferably formed around the open end of the gauge tube or stem 8 and this bead will project slightly adjacent the flange 3 of the coupling neck 2.

A binding or clinch ring 11 of rubber or other suitable material is molded or otherwise formed to have an annular opening 12 therein to receive the flange 3 of the coupling neck, and a sleeve portion 13 to engage snugly around the lower end of the gauge tube or stem 8, the bead 10 being bedded within the material of the ring 11 to hold the tube or stem securely in place.

With this construction of the float element the float bulbs 1 and gauge tubes or stems 8 can be made with extreme accuracy and can be held down to relatively fine variations in size and weight. Also, as the rings 11 will be molded and the specific gravity of the material used in the manufacture of the same can be held substantially constant, the weight of these rings can be maintained quite accurately.

With a hydrometer float element of this type the parts will be assembled, a scale will be inserted and the calibrations will be accomplished in substantially the usual manner. In accordance with usual practice the gauge tube 8 would not be closed at 9 when the parts are assembled but will be left open for proper weighting of the element and insertion and adjustment of the gauge scale, following which the gauge tube 8 would be closed or sealed, as at 9, in the usual manner.

With the adaptation shown in Fig. 2, the gauge stem or tube 8 is of substantially the same form, except that bead 10 is omitted, and the float bulb 1a has the coupling neck 2a extending therefrom in substantially the same manner except that the flange 3a is made slightly larger and the end 4a of this coupling sleeve beyond the flange is increased in size to receive the open end of the tube or stem 8. The clinch ring 11a has an inner groove 12ª to receive the flange 3a and the sleeve 13a engages with the tube or stem 8 to insure a tight joint at this point. As here illustrated, the lower set of projections or centering points is dispensed with and a single set of points is provided at 5a.

With the modified construction illustrated in Fig. 3 the stem or tube 8 is substantially the same as in Figs. 1 and 2 and is provided with the external bead 10 around the open end. The float bulb 1b has the upper end thereof left open and provided with an external bead 14, and a connecting ring 15 has sleeve portions 16 and 17 at its ends adapted to receive and snugly fit beaded ends 10 and 14 of the stem 8 and float bulb 1b respectively, the ring 15 being preferably provided with slight annular grooves to receive the beads 10 and 14 and insure proper seating and a liquid-tight joint between the parts. As here illustrated, the centering points or projections 18 can be provided as a part of the connecting ring 15 to project therefrom and insure proper centering and unrestricted movement of the float element when in use.

In the modified construction shown in Fig. 4 the gauge stem or tube 8c has a flange 10c projecting inwardly at the open end thereof and the float bulb 1c has a flange or bead 14c inwardly extending at its open end. A connecting ring 19 has sleeves 20 and 21 at its ends adapted to fit snugly within the open ends of the tube 8c and float bulb 1c respectively, slight grooves being preferably provided to receive the beads or flanges 10c and 14c, and in this way the float bulb and the gauge tube or stem are connected together with a liquid-tight joint.

With the construction shown in both Fig. 3 and Fig. 4 it may be found necessary or desirable to use some adhesive material to seal between the connecting ring and the float bulb and stem members. With the construction shown in Fig. 4 the part 19, referred to as a ring, might be made as a solid plug, said plug being of a material to keep down the weight of the finished instrument.

While I have intimated that the gauge stem or tube will be of wafer-thin glass or other frangible material to have a paper gauge scale fitted therein, in the usual manner to be viewed through the transparent material, some opaque and non-frangible material might be used, and it is possible that gauge scale markings might be made upon or applied to the exterior of this stem.

While I have herein shown and described only certain specific embodiments of my present invention and have suggested only certain possible modifications in the form, construction and assembly of the parts, it will be appreciated that changes and variations can be made without departing from the spirit and scope of this invention.

I claim:

1. A hydrometer float comprising, a float portion having an open coupling portion at one end, a gauge stem open at one end, and an intermediate member of soft rubber fitted to said coupling portion and the open end of the stem to secure said float portion and stem portions together and close the openings thereof.

2. A hydrometer float comprising, a float portion open at one end and closed at the other, a gauge stem open at one end and closed at the other, a coupling sleeve of soft rubber fitted upon the open ends of said float portion and stem portion to connect said parts in alined relation and to seal the open ends liquid-tight, said intermediate sleeve having integral projections extending laterally beyond the float and stem portions to reduce frictional contact of the float when in use.

3. A hydrometer float comprising, a float portion open at one end and closed at the other, a gauge stem open at one end and closed at the other, one of said portions having a bead formation around the open end thereof, and a coupling sleeve of soft rubber fitted to the open ends of the float portion and stem portion to connect these portions and close the open ends thereof, said coupling member being provided with a grooved formation to receive the bead formation.

4. A hydrometer float comprising, a float portion open at one end and closed at the other and having a bead formation around the open end, a gauge stem open at one end and closed at the other and having a bead formation around the open end, and a coupling sleeve of elastic soft rubber fitted at the open ends of the float portion and stem portion and provided with grooved formations to receive and hold upon the bead formations of the float and stem portions.

5. A hydrometer float comprising, a float portion closed at one end and provided with a restricted sleeve opening at the other end, said sleeve portion having a bead formation around the opening thereof, a gauge stem closed at one end and open at the other and provided with a bead formation around the open end, and a coupling sleeve of elastic soft rubber to be fitted over the open ends of the float and stem portions and provided with grooved formations to receive and hold upon the bead formations of said portions.

LEO EDELMANN.